(No Model.)
E. D. SEGAR.
SUPPORT FOR LANTERNS.
No. 571,803.    Patented Nov. 24, 1896.
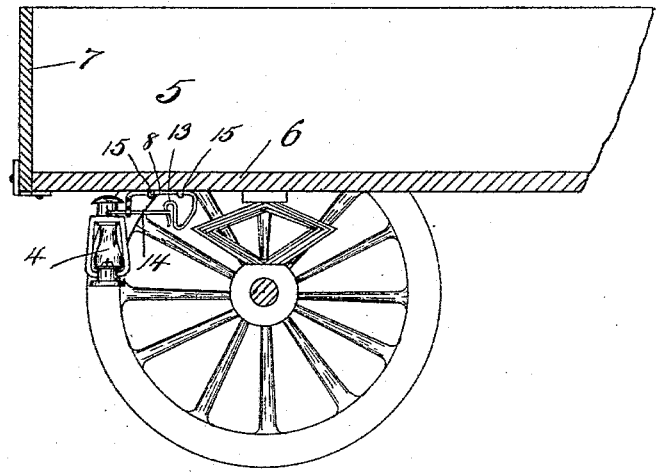
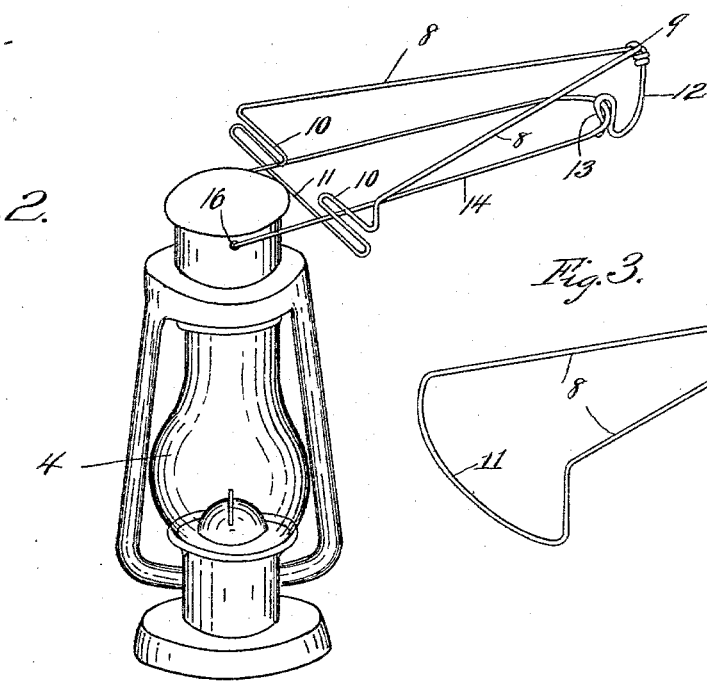
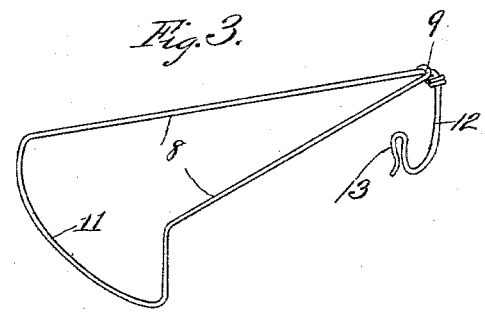
WITNESS:
INVENTOR
Eugene D. Segar.
BY
Edgar Tate & Co
ATTORNEYS

UNITED STATES PATENT OFFICE.

EUGENE DEXTER SEGAR, OF RANDOLPH, VERMONT.

SUPPORT FOR LANTERNS.

SPECIFICATION forming part of Letters Patent No. 571,803, dated November 24, 1896.

Application filed August 26, 1896. Serial No. 603,963. (No model.)

*To all whom it may concern:*

Be it known that I, EUGENE DEXTER SEGAR, a citizen of the United States, and a resident of Randolph, in the county of Orange and State of Vermont, have invented certain new and useful Improvements in Supports for Lanterns, of which the following is a specification, reference being had to the accompanying drawings, forming a part thereof, in which similar numerals of reference indicate corresponding parts wherever found throughout the several views.

This invention relates to means for supporting lanterns in connection with and beneath the end of a wagon-body, and the object thereof is to provide an improved device of this class which is simple in construction and operation and by means of which a lantern may be quickly suspended beneath and detached from the end of a wagon-body.

The invention is fully disclosed in the following specification, of which the accompanying drawings form a part, in which—

Figure 1 is a central vertical section of the forward end of a wagon-body and one of the axles thereof, showing one of the forward wheels in position and showing a lantern suspended therefrom; Fig. 2, a perspective view of the lantern-support and showing the lantern connected therewith, and Fig. 3 a perspective view of a modified form of the support.

In the drawings forming part of this specification I have shown at 5 a portion of a wagon-body provided with a bottom 6 and a front end board or gate 7, and in the practice of my invention I provide means for suspending a lantern thereunder, which consists of a support shown in Fig. 2 and which is composed of wire and which is triangular in form, being composed of two sides 8, which are connected at 9, and the opposite ends thereof are bent inwardly and outwardly to form loops 10 and then bent inwardly to form a cross-bar 11, or in practice this device may be composed of a single wire, one end of which is bent downwardly, as shown at 12, and upwardly and then downwardly to form a hook 13, and from which one of the sides 8 is then formed, said wire being bent to form the adjacent loop 10, the cross-bar 11, the opposite loop 10, the adjacent side bar 8, and being connected with the end of the opposite side 8, as shown at 9.

The lantern 4 may be of the usual or any desired form, and said lantern is provided with the usual bail 14, and in practice the holder or support is connected with the bottom of the wagon-body by staples or similar fastening devices 15, through which the sides 8 thereof pass, and the bail 14 of the lantern is passed through the space between the cross-bar 11 of the support and the loops 10 and backwardly and connected with the hook 13, as clearly shown in Fig. 2, and said lantern will thus be securely supported while being adapted to swing on the ends of the bail in the usual manner, said bail being pivotally connected therewith at 16, as shown in Fig. 2.

The loops 10 prevent the jolting or jarring of the lantern to a considerable extent; but in Fig. 3 I have shown a modified form of construction in which the loops 10 are omitted and only the cross-bar 11 employed, this cross-bar being preferably yoke-shaped or segmental in form, and with this exception the support is the same as that shown in Fig. 2, and this form of support is also adapted to be secured to the bottom of the wagon-body, as hereinbefore described, and when suspending a lantern therefrom the bail 14 is passed backwardly over the cross-bar or yoke 11 and connected with the hook 13, as hereinbefore described.

As thus constructed it will be seen that the end of the support provided with the cross-bar 11 constitutes the front end thereof and the end provided with the hook 12 the rear end, and the lantern is suspended in front of the support.

This device is simple in construction and operation and perfectly adapted to accomplish the result for which it is intended, while being comparatively inexpensive.

Having fully described my invention, I claim as new and desire to secure by Letters Patent—

1. The herein-described support for lanterns which is adapted to be connected with a wagon-body, said support consisting of two side arms which are designed to be connected with the bottom of the wagon-body, and which are connected at the front end with a cross-bar which projects below said side arms, and said support being provided at the end opposite said cross-bar with a hook, the ends of said arms which are connected by the cross-bar being also provided with inwardly-directed loops below which the cross-bar is placed, substantially as shown and described.

2. The herein-described support for a lantern, which is composed of spring-wire which consists of the two side arms 8, which are connected at one end, and provided at the opposite end with inwardly-directed loops below which is a cross-bar, said support being also provided at the end opposite said loops and cross-bar, with a hook with which the bail of the lantern is adapted to be connected, substantially as shown and described.

In testimony that I claim the foregoing as my invention I have signed my name, in presence of the subscribing witnesses, this 20th day of August, 1896.

EUGENE DEXTER SEGAR.

Witnesses:
CLARENCE MANN,
H. B. BELL.